United States Patent
Sheng et al.

(10) Patent No.: US 10,621,781 B2
(45) Date of Patent: Apr. 14, 2020

(54) ROBUSTLY BLENDING SURFACES VIA SPHERICAL PARAMETRIZATION

(71) Applicant: AUTODESK, Inc., San Rafael, CA (US)

(72) Inventors: Xuejun Sheng, Ann Arbor, MI (US); Hooman Shayani, London (GB); Robert Bolter, Cambridge (GB)

(73) Assignee: Autodesk, Inc., San Rafael, CA (US)

( * ) Notice: Subject to any disclaimer, the term of this patent is extended or adjusted under 35 U.S.C. 154(b) by 93 days.

(21) Appl. No.: 15/243,706

(22) Filed: Aug. 22, 2016

(65) Prior Publication Data

US 2017/0148207 A1 May 25, 2017

Related U.S. Application Data

(60) Provisional application No. 62/259,013, filed on Nov. 23, 2015.

(51) Int. Cl.
*G06T 17/30* (2006.01)
*G06T 17/10* (2006.01)

(52) U.S. Cl.
CPC .............. *G06T 17/10* (2013.01); *G06T 17/30* (2013.01)

(58) Field of Classification Search
None
See application file for complete search history.

(56) References Cited

U.S. PATENT DOCUMENTS

| | | | | |
|---|---|---|---|---|
| 7,952,575 | B2 * | 5/2011 | Rosel | G06T 17/30 345/419 |
| 2004/0108999 | A1 * | 6/2004 | Martin | G06T 17/20 345/423 |
| 2005/0285855 | A1 * | 12/2005 | Chien | G06T 17/10 345/419 |

(Continued)

OTHER PUBLICATIONS

Bastl, B. et al. "Blends of canal surfaces from polyhedral medial transform representations," Comput Aided Design, Nov. 2011, 43(11): 1477-1484.

(Continued)

*Primary Examiner* — Andrew G Yang
(74) *Attorney, Agent, or Firm* — Artegis Law Group, LLP

(57) ABSTRACT

In various embodiments of the present invention, a blending engine blends multiple surfaces included in a three-dimensional (3D) model of an object. First, the blending engine trims off portions of the surfaces that are targeted for blending at trimming curves to generate trimmed surfaces. The blending engine then constructs a single parametric blending surface via a unified parametrization for the trimming curves. Notably, to achieve the unified parametrization, the blending engine performs one or more spherical parametrization operations that generate parametrized curves based on the trimming curves and a fundamental sphere. After constructing the parametric blending surface based on the parametrized curves, the blending engine joins the parametric blending surface to the trimmed surfaces to produce a final, smooth intersection between the surfaces. Advantageously, because the blending engine creates a single parametric blending surface, the blending engine can blend arbitrary pipe surfaces and is compatible with computer-aided design modeling subsystems.

21 Claims, 6 Drawing Sheets

(56) References Cited

U.S. PATENT DOCUMENTS

| | | | | |
|---|---|---|---|---|
| 2008/0024499 A1* | 1/2008 | Bateman | ............... | G06T 17/30 |
| | | | | 345/441 |
| 2012/0089374 A1* | 4/2012 | Kripac | ................ | G06T 17/30 |
| | | | | 703/1 |
| 2012/0182293 A1* | 7/2012 | Nolze | ................ | G06T 15/10 |
| | | | | 345/419 |
| 2013/0293541 A1* | 11/2013 | Maisonneuve | ....... | G06T 17/205 |
| | | | | 345/420 |
| 2014/0184599 A1* | 7/2014 | Quilot | ................ | G06T 17/20 |
| | | | | 345/423 |
| 2014/0354639 A1* | 12/2014 | Rockwood | ............ | G06F 17/50 |
| | | | | 345/420 |

OTHER PUBLICATIONS

Foufou, S. et al. "Dupin Cyclide Blends Between Quadric Surfaces for Shape Modeling," Eurographics 2004 / M.-P. Cani and M. Slater (Guest Editors), vol. 23 (2004), No. 3, 10 pages.

Pratt, V. "Direct Least-Squares Fitting of Algebraic Surfaces," Sun Microsystems Inc. and Stanford University, Apr. 30, 1987, 19 pages.

* cited by examiner

ROBUSTLY BLENDING SURFACES VIA SPHERICAL PARAMETRIZATION

CROSS-REFERENCE TO RELATED APPLICATIONS

This application claims the priority benefit of the U.S. Provisional Patent Application having Ser. No. 62/259,013 and filed on Nov. 23, 2015. The subject matter of this related application is hereby incorporated herein by reference.

BACKGROUND OF THE INVENTION

Field of the Invention

Embodiments of the present invention relate generally to computer science and, more specifically, to robustly blending surfaces via spherical parametrization.

Description of the Related Art

As part of developing models for physical objects, many users configure computer-aided design (CAD) modeling subsystems to blend different surfaces in the models. For example, blending operations can be used to soften sharp edges and corners of various objects. In another example, blending operations can be used to join separate objects together, where a smooth transition is created from a surface of one object to a surface of another object. Softening sharp edges included in a model often produces a model that is safer, stronger, more aesthetically pleasing, and/or easier to manufacturer than the original model. Further, smooth surfaces may be required for functional design reasons, such as minimizing the turbulence in pipe connections and manifolds, mitigating high-stress areas in mechanical junctions between beams with circular cross sections, to name a few.

To perform a blending operation when using a CAD modeling subsystem, the user typically selects multiple surfaces included in a model using a graphical user interface. The user then configures a blending engine to apply one or more blending algorithms to the multiple surfaces. The blending algorithms usually implemented in a blending engine are ones that enable acceptable blending results to be achieved across a variety of common blending scenarios. Widely implemented blending algorithms, for example, include edge-blend algorithms that replace sharp edges with smooth blending surfaces and vertex-blend algorithms that soften sharp corners where multiple edges meet at internal vertices.

One drawback to blending algorithms that are commonly implemented in CAD modeling subsystems is that such algorithms oftentimes limit the form and/or type of the surfaces that can be blended. Consequently, conventional, widely-implemented blending algorithms are usually unable to effectively blend arbitrary pipe surfaces, such as cylinders and cones. More complex, but less common, blending algorithms typically suffer from these same limitations or do not produce sufficiently smooth surfaces in the first place. For example, a blending algorithm that blends quadratic surfaces using Dupin cyclides is usually unable to blend arbitrary cones. In another example, a blending algorithm that blends canal surfaces based on a generalization of the media surface transform is usually unable to satisfy "curvature" $G^2$ or higher continuity constraints that are required by many advanced users.

Other blending algorithms do exist that are capable of operating on a wider range of surfaces including arbitrary pipe surfaces. However, these blending algorithms are typically not compatible with CAD modeling subsystems. For example, implicit blending algorithms are able to operate on a wide range of surfaces, but the algorithms generate implicit surfaces in the Euclidean space $\mathbb{R}^3$. Implicit surfaces are defined as the set of zeros of a function of three variables, typically denoted as $F(x,y,z)=0$. By contrast, CAD modeling subsystems typically operate on parametric surfaces that are defined by parametric equations of two variables $\Omega \in \mathbb{R}^2$, typically denoted as $(u,v) \in \mathbb{R}^2$. To integrate implicit blending algorithms into CAD modeling subsystems would require parametrization of implicit surfaces. As persons skilled in the art will recognize, techniques for performing parametrization of implicit surfaces are limited to special cases and are oftentimes unacceptably inefficient.

In sum, existing blending algorithms are usually unable to operate on arbitrary pipe surfaces, do not produce sufficiently smooth surfaces in the first place, and/or are incompatible with CAD modeling subsystems. As a result, users may be unable to configure CAD modeling subsystems to perform blending operations that produce models that meet functionality, aesthetic, and/or manufacturing requirements.

As the foregoing illustrates, what is needed in the art are more effective techniques for blending surfaces.

SUMMARY OF THE INVENTION

One embodiment of the present invention sets forth a computer-implemented method for blending a plurality of surfaces included in a three-dimensional (3D) model of an object. The method includes performing one or more trimming operations on at least two surfaces included in the plurality of surfaces based on a plurality of trimming curves to produce a set of trimmed surfaces; performing one or more spherical parametrization operations based on the trimming curves and a fundamental sphere to produce a plurality of parametrized curves; generating a parametric blending surface based on the parametrized curves; and joining the parametric blending surface to the set of trimmed surfaces to generate a new model that includes at least one intersection between the at least two surfaces.

One advantage of the disclosed approach is that CAD modeling subsystems may blend arbitrary surfaces while satisfying high curvature continuity constraints. Notably, constructing a single parametric blending surface via a unified parametrization for all the trimming curves overcomes limitations of conventional blending techniques that are compatible with CAD modeling subsystems. Consequently, CAD modeling subsystems may generate models for complex physical objects that meet functionality, aesthetic, and/or manufacturing requirements that are not achievable using conventional blending techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
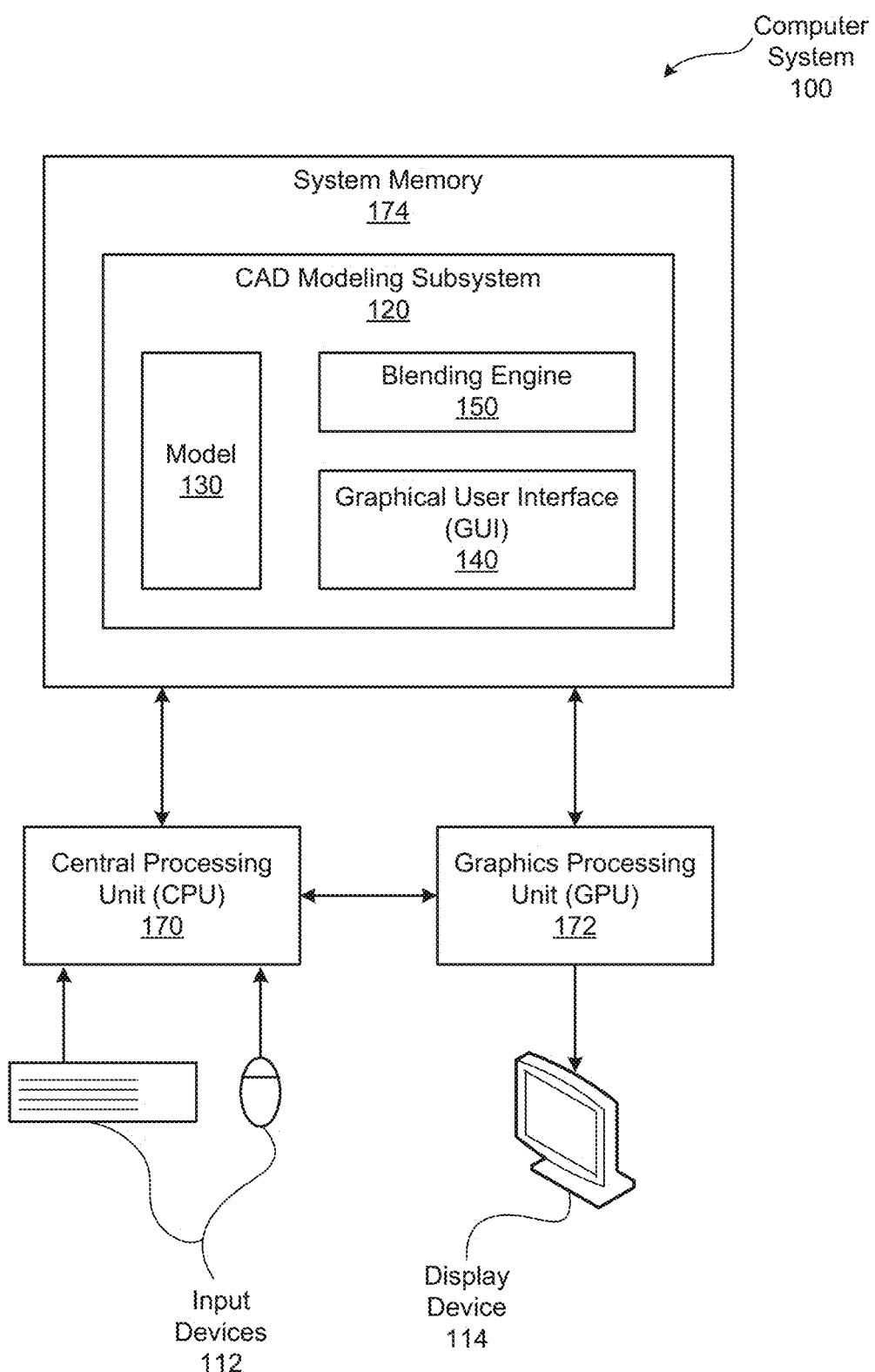
FIG. 1 illustrates a computer system configured to implement one or more aspects of the present invention.

FIG. 1 illustrates a computer system 100 configured to implement one or more aspects of the present invention. As shown, the computer system 100 includes, without limitation, a central processing unit (CPU) 170, input devices 112, a graphics processing unit (GPU) 172, a display device 114, and a system memory 174.

The CPU 170 receives input user input information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores software content, such as software applications and data, for use by the CPU 170 and the GPU 172. As shown, the system memory 174 includes, without limitation, a computer-aided design (CAD) modeling subsystem 120. The CAD modeling subsystem 120 includes, without limitation, a model 130, a graphical user interface (GUI) 140, and a blending engine 150. In alternate embodiments, the CAD modeling subsystem 120 may include any number and type of software applications and data structures in any combination.

The CAD modeling subsystem 120 enables, without limitation, specification of the model 130 and subsequent modification of the model 130. The model 130 is a boundary representation of a desired 3D object. A boundary representation includes a topological description and a geometric representation. The topological representation specifies the interconnections of faces (i.e., bounded regions of surfaces), edges (i.e., bounded pieces of curves), and vertices (i.e. points). The geometric representation includes equations that define the surfaces and edges, and coordinates that define the vertices. In particular, surfaces included in the model 130 are defined by parametric equations of two variables $\Omega \in \mathbb{R}^2$ denoted as $(u,v) \in \mathbb{R}^2$. For example, a pipe surface is a closed profile C(t) sweeping along a path P(t) defined by the parametric equation:

$$S(u,v)=P(v)+C(u)M(v) \tag{1}$$

where M(v) is a 3×3 matrix specifying the profile frame and the scaling factor along the path.

The GUI 140 converts user input such as symbols and brush stroke operations to geometries in the model 130. The GUI 140 is configured to receive user input information from the input devices 112, such as a keyboard or a mouse. After the CAD modeling subsystem 120 processes the user input information in conjunction with the model 130, the CAD modeling subsystem 120 delivers pixels to the display device 114. The display device 114 may be any conventional cathode ray tube, liquid crystal display, light-emitting diode display, or the like. The CAD modeling subsystem 120 is configured to continuously repeat this cycle, enabling the user to dynamically interact with the model 130 based on corresponding images on the display device 114.

Oftentimes, as part of interacting with the model 130, users configure the CAD modeling subsystem 120 to blend one or more of the surfaces included in the model 130. The user typically selects one or more surfaces, selects a blending algorithm, and fine-tunes the selected blending algorithm via the GUI 140. In response to the user input information, the blending engine 150 applies the selected blending algorithm to the selected surfaces. For example, the user could select the surfaces where edges meet at an internal vertex, select an edge blend algorithm, and fine-tune the edge blend algorithm to specify appropriate setbacks in terms of the distance along an edge back from the vertex. In such a scenario, the blending engine 150 would apply the edge blend algorithm to the selected surfaces to create a blending surface within the limits specified by the setbacks.

In general, to blend multiple selected surfaces, the blending engine 150 computes "trimming curves." The trimming curves define portions of the selected surfaces that are targeted for replacement with a smoother blending surface. The blending engine 150 then trims away the unwanted portions of the selected surfaces based on the trimming curves. Subsequently, the blending engine 150 computes a blending surface that smoothly connects the remaining portions of the selected surfaces along the trimming curves based on the selected blending algorithm. Finally, the blending engine 150 integrates the blending surface with the remaining portions of the selected surfaces to generate a final, smooth surface.

As is well known, conventional blending engines that are implemented in CAD modeling subsystems commonly implement one or more blending algorithms that operate on parametric surfaces, such as those included in the model 130. However, such "parametric" blending algorithms limit the form and/or type of the surfaces that can be blended. In particular, parametric blending algorithms implement underlying algorithms that are unable to compute a uniform parametrization for trimming curves of multiple arbitrary pipe surfaces. Consequently, parametric blending algorithms are unable to generate a blending surface between arbitrary pipe surfaces.

Accordingly, users of conventional CAD modeling subsystems that implement parametric blending algorithms may be unable to configure the conventional CAD modeling subsystems to blend some of the surfaces included in the models. As a result, physical objects manufactured based on the models may not meet functionality, aesthetic, and/or manufacturing requirements. For example, conventional CAD modeling subsystems may be unable to blend pipe connections and manifolds specified in a model of a desired physical object. Consequently, flows in the physical object manufactured based on the model may be unacceptably turbulent.

Blending Pipe Surfaces Via Spherical Parametrization

To enable the CAD modeling subsystem 100 to effectively blend arbitrary pipe surfaces, the blending engine 150 implements a "spherical parametrization" blending algorithm. More specifically, the blending engine 150 performs a two phase spherical mapping of the trimming curves from three-dimensional (3D) space onto a two-dimensional (2D) parametric domain. In a first phase, the blending engine 150 projects the trimming curves of the selected pipe surfaces onto a fundamental sphere to generate corresponding projected curves. In a second phase, the blending engine 150 maps the projected curves to a two-dimensional (2D) plane via stereographic projection to generate parametrized curves. As persons skilled in the art will recognize, such a spherical parametrization provides a unified parametrization for all the trimming curves of the selected pipe surfaces. The blending engine 150 then computes a single parametric blending surface based on the parametrized curves.

In alternate embodiments, the system memory 174 may not include the CAD modeling subsystem 120 and/or the CAD modeling subsystem 120 may not include the model 130, the GUI 140, and/or blending engine 150. In such embodiments, the model 130 may be stored in any suitable memory and the GUI 140 may be replaced with any technically feasible mechanism for receiving user input. Further, the blending engine 150 may be implemented as a standalone software application or integrated into any number (including one) of software applications. In some embodiments, the CAD modeling subsystem 120, the GUI 140, and/or the blending engine 150 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the CAD modeling subsystem 120 and the blending engine 150 described herein are not limited to any particular computing system and may be adapted to take advantage of new computing systems as they become available.

It will be appreciated that the computer system 100 shown herein is illustrative and that variations and modifications are possible. The number of the CPUs 170, the number of the GPUs 172, the number of the system memories 174, and the number of applications included in the system memory 174 may be modified as desired. Further, the connection topology between the various units in the computer system 100 may be modified as desired. In some embodiments, any combination of the CPU 170, the GPU 172, and the system memory 174 may be replaced with any type of distributed computer system or cloud computing environment, such as a public or a hybrid cloud.

FIGS. 2A-2G are exemplary illustrations of a sequence of operations performed by the blending engine 150 of FIG. 1 when blending different pipe surfaces 210, according to various embodiments of the present invention. In alternate embodiments, many modifications to the number of operations, the sequence of operations, the operations, the results of the operations, and the inputs to the operations will be apparent to those of ordinary skill in the art without departing from the scope and spirit of the described embodiments. Also for explanatory purposes, multiple instances of like objects are denoted with reference numbers identifying the object and parenthetical numbers identifying the instance where needed.

Figure 2A:
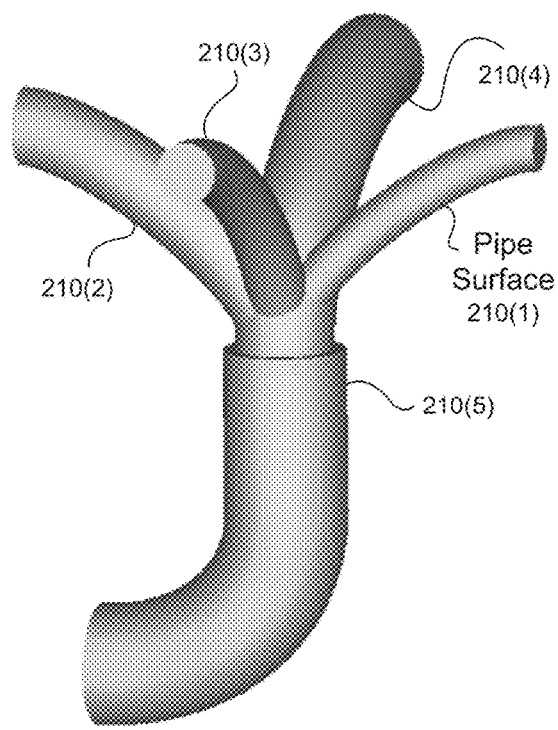
FIGS. 2A-2G are exemplary illustrations of a sequence of operations performed by the blending engine of FIG. 1 when blending different pipe surfaces, according to various embodiments of the present invention.

As shown in FIG. 2A, initially the blending engine 150 receives five joined pipe surfaces 210(1)-210(5) that are selected for blending. The blending engine 150 may receive the pipe surfaces 210(1)-210(5) in any technically feasible fashion. For example, in some embodiments the blending engine 150 receives the pipe surfaces 210(1)-210(5) from the GUI 140 or another software application included in the CAD modeling subsystem 120.

Figure 2B:
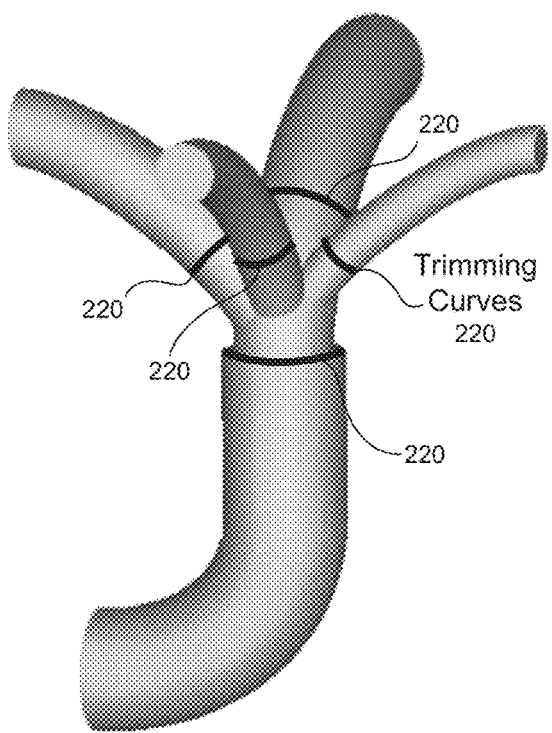

Subsequently, as shown in FIG. 2B, the blending engine 150 generates trimming curves 220 on the pipe surfaces 210. The trimming curves 220 form one or more closed loops on the pipe surfaces 210. The one or more trimming curves 220 that form a single closed loop on a particular pipe surface 220 are referred to herein as a "trimming loop." Each of the trimming loops defines a boundary of the portion of an associated pipe surface 210 that is targeted for smoothing. The blending engine 150 may generate the trimming curves 220 in any technically feasible fashion that ensures that the distance between the trimming curves 220 enables the blending engine 150 to satisfy any continuity constraints (e.g., $G^2$ or higher continuity). In alternate embodiments, other software applications (not shown) included in the CAD modeling subsystem 120 may generate and transmit the trimming curves 220 to the blending engine 150 in any manner as known in the art.

In some embodiments, to generate the trimming curves 220 at a junction center between the pipe surfaces 210, the blending engine 150 computes a maximized radius of incidence for a sphere that is centered at the junction center. The maximized radius provides the required space between the trimming curves 220 to enable the blending engine 150 to satisfy the continuity constraints. The blending engine 150 then computes the intersection of the sphere with the pipe surfaces 210 to generate the trimming curves 220 on the pipe surfaces 210.

In some other embodiments, the blending engine 150 computes different radii for different points included in a multifaceted discrete representation of the pipe surfaces 210. Each of the resulting sample points are defined by different distances from the junction center of the pipe surfaces 210. The blending engine 150 then uses the sample points as constraint points of a basis spline (B-spline) loop to generate the trimming curves 220 on the pipe surfaces 210.

Figure 2C:
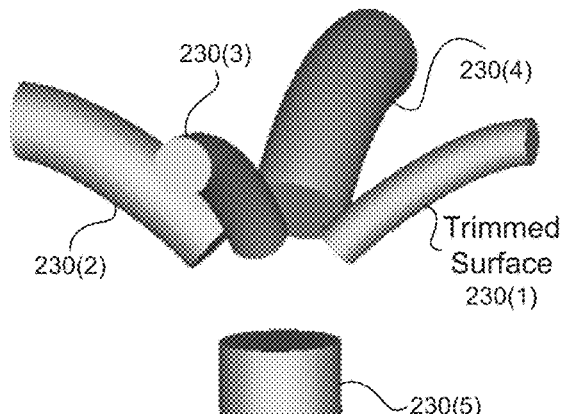

As shown in FIG. 2C, the blending engine 150 removes the extraneous portions of the pipe surfaces 210. In operation, for each of the pipe surfaces 210, the blending engine 150 trims off the extraneous portion of the pipe surface 210 based on the trimming curves 220 that form the associated trimming loop. The remaining portions of the pipe surfaces 210 are trimmed surfaces 230. As part of computing a smoother surface to connect the trimmed surfaces 230, the blending engine 150 then performs a spherical parametrization of the trimming curves 220.

As referred to herein, a parametrization of a surface is a mapping $\mathbb{R}^2 \to \mathbb{R}^3$. More precisely, suppose that $\Omega \in \mathbb{R}^2$ is a simply connected region and the function $f: \Omega \to \mathbb{R}^3$ is continuous and injective (i.e., preserves distinctness). In such a scenario, a surface S is the image of $\Omega$ under $f$:

$$S = f(\Omega) = \{f(u,v) : (u,v) \in \Omega\} \quad (2)$$

Further, $f$ is a parametrization of S over the parametric domain $\Omega$. As persons skilled in the art will recognize, $f$ is also a bijection (i.e., one-to-one correspondence) between S and $\Omega$ and the inverse of $f$ is $f^{-1}:S \to \Omega$.

The quality of a parametrization may be assessed based on the metric distortion of the parametrization when mapping from a 2D domain to 3D space. If the parametrization preserves angles, the parametrization is referred to as "conformal." To enable the blending engine 150 to satisfy the continuity constraints, the blending engine 150 generates a spherical parametrization of the trimming curves 220 that is conformal.

The spherical parametrization includes two phases: a "projection" phase and a "mapping" phase. During the projection phase, the blending engine 150 projects the trimming curves 220 onto a fundamental sphere (not shown in FIG. 2) along the normal vectors of the fundamental sphere to generate projected curves (not shown in FIG. 2). In the mapping phase, the blending engine 150 maps the projected curves onto a plane via stereographic projection (a well-known technique to create world maps) to generate parametrized curves (not shown in FIG. 2). An example of a spherical parametrization operation performed by the blending engine 150 is described in greater detail below in conjunction with FIG. 3.

Figure 2D:
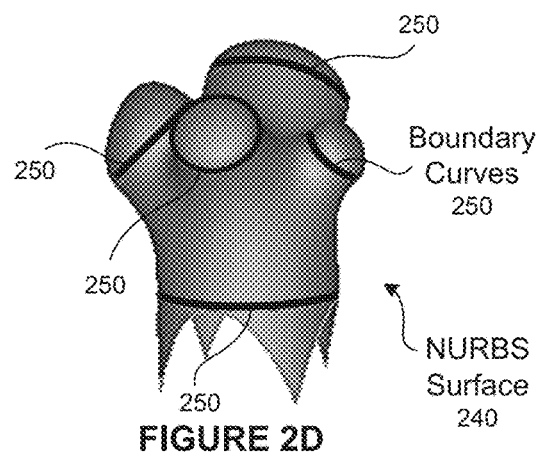

After the blending engine 150 generate the parametrized curves corresponding to the trimming curves 220, the blending engine 150 interpolates the parametrized curves and the continuity constraints associated with the pipe surfaces 210 to generate a single parametric surface. More specifically, as depicted in FIG. 2D, the blending engine 150 generates a Non-Uniform Rational B-Spline (NURBS) surface 240. In alternate embodiments, the blending engine 150 may generate any number (including one) of parametric surfaces in any technically feasible fashion instead of the NURBS surface 240.

In general, a NURBS surface of degree p in u-direction and degree q in v-direction is defined as a bivariate piecewise rational function of the form:

$$S(u, v) = \sum_{i=0}^{n} \sum_{j=0}^{m} P_{i,j} w_{i,j} N_{i,p}(u) N_{j,q}(v) / \sum_{i=0}^{n} \sum_{j=0}^{m} w_{i,j} N_{i,p}(u) N_{j,q}(v) \quad (3)$$

where $\{P_{i,j}\}$ are $(n+1)\times(m+1)$ control points, $\{w_{i,j}\}$ are weights associated with the control points, and $N_{i,p}(u)$ and $N_{j,q}(v)$ are B-spline base functions of degree p and q in, respectively, the u- and v-directions. Further, as persons skilled in the art will recognize, the NURBS surface is associated with knot vectors that are used to construct the B-spline base functions.

In operation, the blending engine 150 sets the weights included in the equation (3) to unit weights (i.e., $\{w_{i,j}\}=1$). Accordingly, the NURBS surface 240 is reduced to a non-rational B-spline. To refine the shape of the NURBS surface 240, the blending engine 150 minimizes the following function:

$$f = \sum_{k=0}^{M-1} \|Q_k - S(u_k, v_k)\|^2 + \omega F_{smooth} \quad (4)$$

where $\{Q_k\}$ are a set of sample points of the trimming curves 220, $F_{smooth}$ is a smoothness functional, and $\omega$ is a weight that determines the trade-off between the least-squares and the smoothing term.

The blending engine 150 may implement any technically feasible smoothness functional. For example, in some embodiments, the blending engine 150 implements the following smoothness functional based on a thin-plate deformation energy:

$$F_{smooth} = \iint (S_{uu}^2 + 2S_{uv}^2 + S_{vv}^2) du\, dv \quad (5)$$

where $S_{uu}$, $S_{uv}$, and $S_{vv}$ are the second derivatives of the NURBS surface 240. In some other embodiments, the blending engine 150 implements a Minimum Variation Curvature (MVC) as the smoothness functional.

To compute the $(n+1)\times(m+1)$ $\{P_{i,j}\}$ control points included in the equation (3), the blending engine 150 sets the weights and the knot vectors a priori and solves the following linear system:

$$(A^T A + \omega K)X = A^T B \quad (6)$$

where A is an M×N matrix with $N=(n+1)\times(m+1)$, the elements of A are B-spline basis function values, K is a matrix containing the integration values of derivatives of the B-spline base functions, $X=[P_{0,0}, \ldots, P_{n,m}]^T$ is a vector of the B-spline surface control points, and $B=[Q_0, \ldots, Q_{M-1}]^T$ is a vector containing the sample points of the trimming curves 220.

The blending engine 150 expresses continuity (e.g., $G^0$, $G^1$ and $G^2$) constraints along the trimming curves 220 as linear equations C X=D. As a result, the surface fitting for the NURBS surface 240 is a constrained quadratic minimization problem. Accordingly, to fit the NURBS surface 240, the blending engine 150 solves the following linear systems:

$$\begin{bmatrix} (A^T A + \omega K) & C^T \\ C & 0 \end{bmatrix} \begin{bmatrix} X \\ v \end{bmatrix} = \begin{bmatrix} A^T B \\ D \end{bmatrix} \quad (7)$$

where v is a vector that includes Lagrange multipliers.

In operation, the blending engine 150 iteratively fits the NURBS surface 240. Initially, the blending engine 150 selects relatively simple knot vectors. The blending engine 150 also selects sample points based on a relatively coarse sampling of the trimming curves 220. The blending engine 150 then fits a candidate NURBS surface based on the selected knot vectors and the selected sample points. Subsequently, the blending engine 150 determines whether the candidate NURBS surface satisfies predetermined continuity (e.g., $G^0$, $G^1$ and $G^2$) tolerances. If the blending engine 150 determines that the candidate NURBS surface satisfies the predetermined continuity tolerances, then the blending engine 150 sets the NURBS surface 240 equal to the candidate NURBS surface.

If, however, the blending engine 150 determines that the candidate NURBS surface does not satisfy the predetermined continuity tolerances, then the blending engine 150 redefines the knot vectors, selects additional sample points, and generates a new candidate NURBS surface. The blending engine 150 repeatedly generates and evaluates new candidate NURBS surfaces until the candidate NURBS surface satisfies the predetermined continuity tolerances or the number of iterations exceeds a predefined maximum number of iterations.

Figure 2E:
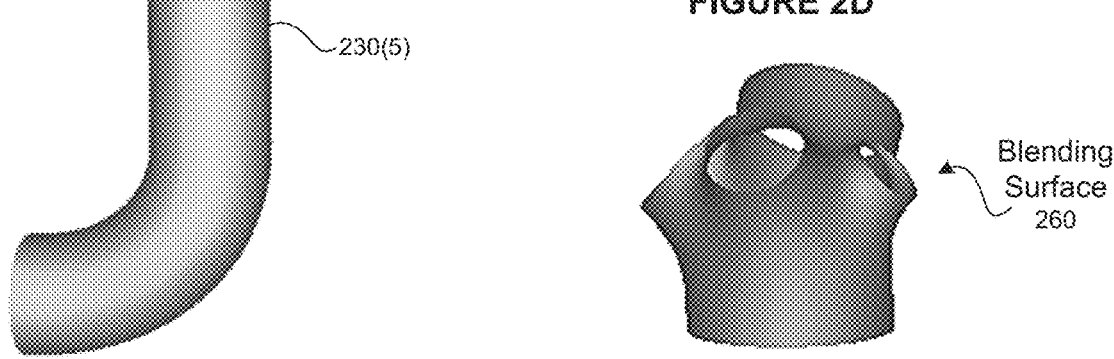

As shown in FIG. 2D, the NURBS surface 240 extends over the parametric domain. Because the NURBS surface 240 is designed to bridge the trimmed surfaces 230, the blending engine 150 trims off the portions of the NURBS surface 240 that lie within the trimmed surfaces 230. More specifically, the blending engine 150 projects the trimming curves 220 onto the NURBS surface 240 to generate the boundary curves 250. The blending engine 150 then trims off the extraneous portions of the NURBS surface 240 based on the boundary curves 250. The remaining portion of the NURBS surface 240 is a blending surface 260 that is shown in FIG. 2E.

Figure 2F:
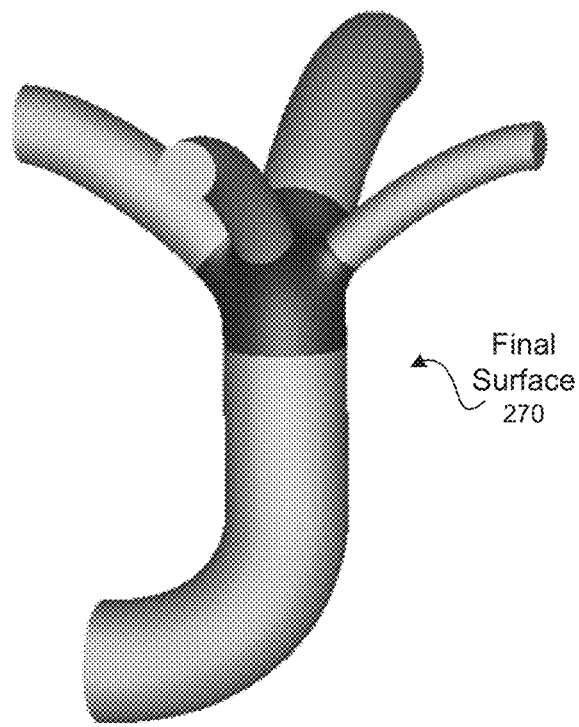
Figure 2G:
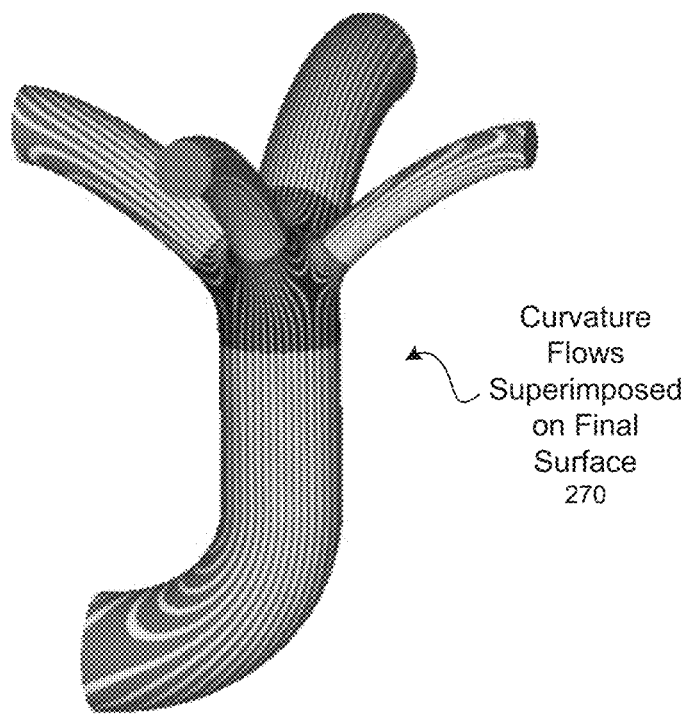

As shown in FIG. 2F, the blending engine 150 stitches (i.e., joins) the blending surface 260 to the trimmed surfaces 230 to generate a final surface 270. The final surface 270 includes at least one intersection between the pipe surfaces 210. Notably, the joint between the pipe surfaces 210 included in the final surface 270 is smoother than the original joint between the pipe surfaces 210. Advantageously, as shown in FIG. 2G, the curvature flows superimposed on the final surface 270 illustrate a $G^2$ continuity between the blending surface 260 and the trimmed surfaces 230.

Figure 3:
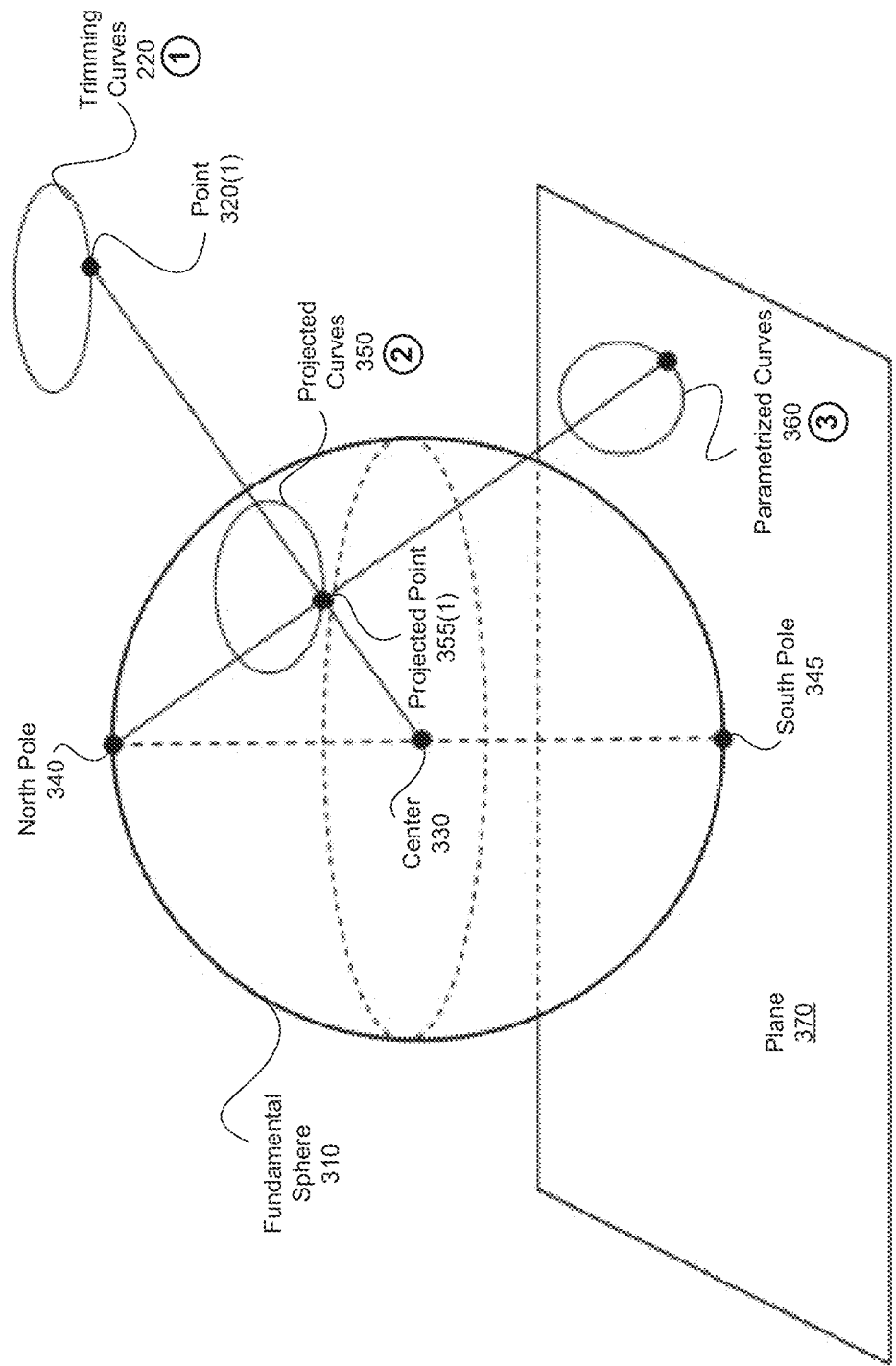
FIG. 3 is an exemplary illustration of a spherical parametrization operation performed by the blending engine of FIG. 1, according various embodiments of the present invention.

FIG. 3 is an exemplary illustration of a spherical parametrization operation performed by the blending engine 150 of FIG. 1, according various embodiments of the present invention. For explanatory purposes only, sequential inputs and results generated by the blending engine 150 are depicted using numbered bubbles. As outlined previously herein, the spherical parametrization includes a projection phase and a subsequent mapping phase. In alternate embodiments, many modifications to the spherical parametrization will be apparent to those of ordinary skill in the art without departing from the scope and spirit of the described embodiments.

As depicted with the bubble numbered "1," the trimming curves 220 are the inputs of the spherical parametrization. In the projection phase, the blending engine 150 projects the trimming curves 220 onto a fundamental sphere 310 along the normal vectors of the fundamental sphere 310. In this fashion and as depicted with the bubble numbered "2," the blending engine 150 generates projected curves 350.

As shown, the fundamental sphere 310 includes, without limitation, a center 330, a north pole 340, and a south pole 345. In general, projecting curves on a sphere is a well-known process. More precisely, if a point ($\vec{P}$) 320(1) is a point to be projected onto the fundamental sphere 310 that is centered at the center ($\vec{O}$) 330 with a radius R, then the blending engine 150 computes a projected point ($\vec{Q}$) 355 along a normal vector of the fundamental sphere 310 as:

$$\vec{Q} = \vec{O} + R(\vec{P}-\vec{O})/|\vec{P}-\vec{O}| \quad (8)$$

As persons skilled in the art will recognize, the projection specified by equation (8) is not necessarily "bijective." Notably, different points 320 may be projected onto a single projected point 355 on the fundamental sphere 310. As is well known, a bijective projection is desirable. Accordingly, to increase the likelihood that the projection is bijective, the blending engine 150 best fits the trimming curves 120 to an algebraic sphere in the least squared sense to generate the fundamental sphere 310. The operations the blending engine 150 performs to generate the fundamental sphere 310 are described in detail in conjunction with FIG. 4. In alternate embodiments, the blending engine 150 may generate the fundamental sphere 310 in any technically feasible fashion.

In the subsequent mapping phase, the blending engine 150 maps the projected curves 350 from the north pole 340 of the fundamental sphere 310 to a plane 370 that is tangent to the south pole 345 of the fundamental sphere 310. In this fashion, and as depicted with the bubble numbered "3," the blending engine 150 generates parametrized curves 360. In operation, the blending engine 150 uses stereographic projection to map the projected curves 350 to parametrized curves 250 in a continuous, bijective, and conformal manner.

As a general matter, because of numerical inaccuracies, a stereographic projection may become unstable in the proximity of the north pole 340. For this reason, the blending engine 150 is configured to select a position for the fundamental sphere 310 to ensure that none of the trimming curves 220 pass through the fundamental sphere 310. In particular, the blending engine 150 chooses the centroid of the longest trimming loop as the north pole 330 of the fundamental sphere 120. As a result, the north pole 340 of the fundamental sphere 310 is inside the longest trimming loop.

The blending engine 150 may perform the stereographic projection in any technically feasible fashion to complete the parametrization of the trimming curves 220. For example and for explanatory purposes only, suppose that the radius of the fundamental sphere 310 is 1 and the center 330 of the fundamental sphere 310 is at coordinates (0, 0, 1). Further, suppose that a parametric domain (u,v) is centered at the south pole 345 of the fundamental sphere 310. In such a scenario, the blending engine 150 computes the parametrization as:

$$f(u, v) = \left\{ \frac{4u}{4+u^2+v^2}, \frac{4v}{4+u^2+v^2}, \frac{2(u^2+v^2)}{4+u^2+v^2} \right\} \quad (9)$$

Accordingly, the inverse parametrization is:

$$f^{-1}(x, y, z) = \left\{ \frac{xz}{2-z}, \frac{yz}{2-z} \right\} \quad (10)$$

Notably, because the blending engine 150 implements a bijective projection as part of the first phase of the spherical parametrization, the parametrization specified by equation (9) is bijective.

Figure 4:
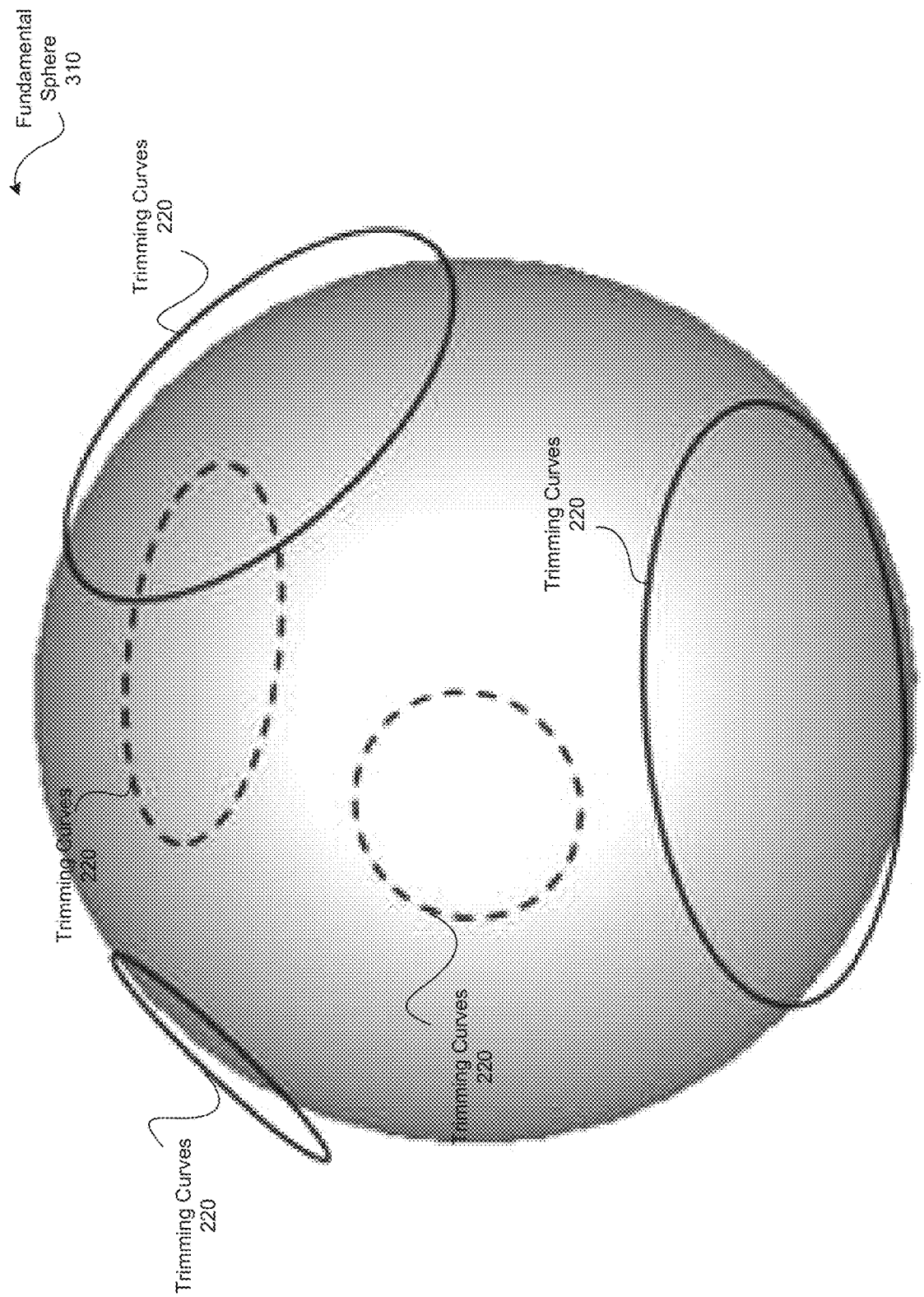
FIG. 4 is an exemplary illustration of the fundamental sphere of FIG. 3, according to various embodiments of the present invention.

FIG. 4 is an exemplary illustration of the fundamental sphere 310 of FIG. 3, according to various embodiments of the present invention. To ensure that the parametrization of the trimming curves 220 is bijective, the blending engine 150 best fits an algebraic sphere to all the trimming curves 220 in the least squared sense to generate the fundamental sphere 310. In alternate embodiments, the blending engine 150 may receive or generate any number of the trimming curves 220, and the blending engine 150 may generate the fundamental sphere 310 in any technically feasible fashion based on the trimming curves 220.

In operation, the blending engine 150 generates an equation with a radius and a center of an algebraic sphere as the unknowns and then minimizes the sum of the squared algebraic distances to the trimming curves 220 to generate the fundamental sphere 310. In alternate embodiments, the blending engine 150 may best fit any type of sphere in any technically feasible fashion to generate the fundamental sphere 310. For example, in some alternate embodiments, the blending engine 150 sets up an equation with the radius and the center of a sphere as the unknowns and then minimizes the sum of the squared Euclidean distances to the trimming curves 220.

As referred to herein, the algebraic sphere is defined as the 0-isosurface of the scalar field $S_u(x)=[1,x^T,x^Tx]\,u$, where $u=[u_0,u_1,u_2,u_3,u_4]^T$ is the vector of scalar coefficients describing the algebraic sphere. For $u_4 \neq 0$ the corresponding center (c) and radius r of the algebraic sphere are:

$$c = -[u_1, u_2, u_3]^T / 2u_4, \qquad (11)$$
$$r = \sqrt{c^T c - u_0 / u_4}$$

For a given set of trimming curves $C=\{C_i(t)\}$ 220, the blending engine 150 computes an object function used to best fit the algebraic sphere as follows:

$$f(x) = \operatorname{argmin} \sum_i \int \|S(x_i)\|^2 ds_i \qquad (12)$$

where $ds_i$ is the derivative of arc length along the $i^{th}$ trimming curve 220.

As persons skilled in the art will recognize, the solution to the equation (12) can be expressed in a linear system of equations:

$$Au=0 \qquad (13)$$

where A is a 5×5 symmetric matrix. To avoid the trivial solution $f(x)=0$, the blending engine 150 implements a constraint that fixes the norm of the gradient at the sphere surface to unit length as follows:

$$\|(u_1,u_2,u_3)\|^2 - 4u_0 u_4 = 1 \qquad (14)$$

The equation (13) may be expressed in matrix form as:

$$u^T Bu = 0 \qquad (15)$$

where $$B = \begin{pmatrix} 0 & 0 & 0 & 0 & -2 \\ 0 & 1 & 0 & 0 & 0 \\ 0 & 0 & 1 & 0 & 0 \\ 0 & 0 & 0 & 1 & 0 \\ -2 & 0 & 0 & 0 & 0 \end{pmatrix} \qquad (16)$$

Based on equation (16), to minimize the sum of the squared algebraic distances from the algebraic sphere to the trimming curves 220, the blending engine 150 solves the following generalized eigenproblem:

$$Au = \gamma Bu \qquad (17)$$

where $\gamma$ is the Lagrange multiplier. The blending engine 150 then defines the fundamental sphere 310 based on the eigenvalue of the smallest positive eigenvector.

Figure 5:
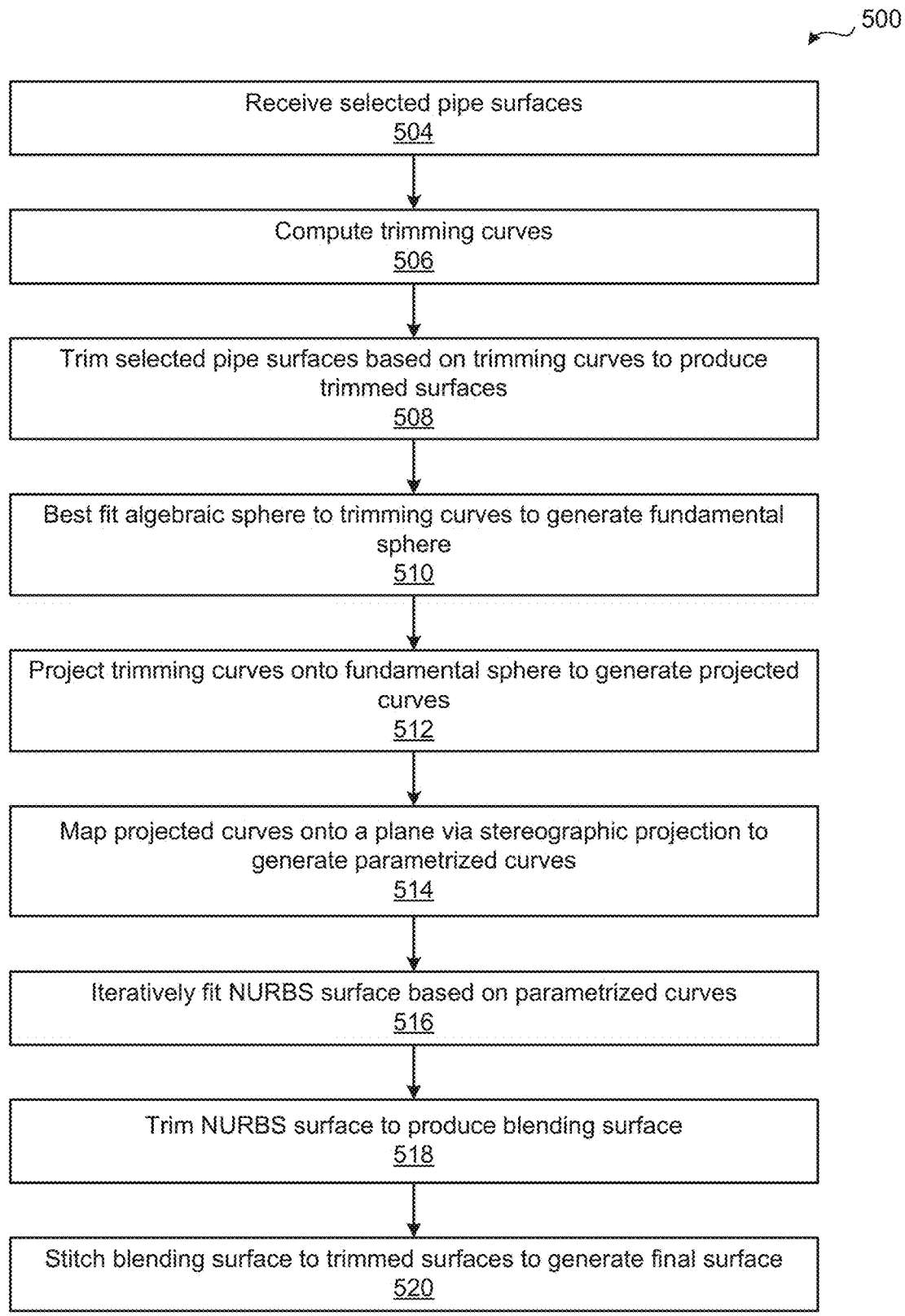
FIG. 5 is a flow diagram of method steps for blending multiple pipe surfaces, according to various embodiments of the present invention.

FIG. 5 is a flow diagram of method steps for blending multiple pipe surfaces, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 504, where the blending engine 150 receives the pipe surfaces 210 that are selected for blending. The blending engine 150 may receive the selected pipe surfaces 210 in any technically feasible fashion. For example, in some embodiments, the pipe surfaces 210 may be selected via the GUI 140 included in the CAD modeling subsystem 120.

At step 506, the blending engine 150 computes the trimming curves 220 on the selected pipe surfaces 210. The blending engine 150 may computes the trimming curves 220 in any technically feasible fashion that ensures that the distance between the trimming curves 220 enables the blending engine 150 to satisfy any continuity constraints (e.g., $G^2$ or higher continuity). In alternate embodiments, other software applications included in the CAD modeling subsystem 120 may generate and transmit the trimming curves 220 to the blending engine 150 in any manner as known in the art. At step 508, the blending engine 150 trims the selected pipe surfaces 210 based on the trimming curves 220 to produce the trimmed surfaces 230. Notably, the blending engine 150 discards the portions of the selected pipe surfaces 210 that are targeted for replacement with a smoother surface that joins the selected pipe surfaces 210.

At step 510, the blending engine 150 best fits an algebraic sphere to all the trimming curves 220 in the least squared sense to generate the fundamental sphere 310. More specifically, the blending engine 150 generates an equation with the radius and the center of the algebraic sphere as the unknowns and then minimizes the sum of the squared algebraic distances from the algebraic sphere to the trimming curves 220. In alternate embodiments, the blending engine 150 may construct the fundamental sphere 310 in any technically feasible fashion.

At step 512, the blending engine 150 projects the trimming curves 220 onto the fundamental sphere 310 along the normal vectors of the fundamental sphere 310 to generate the projected curves 350. Step 512 is the first phase in a spherical parametrization of the trimming curves 220. At step 514, the blending engine 150 maps the projected curves 350 to the plane 370 via stereographic projection to generate the parametrized curves 360. The plane 370 is a two-dimensional parametric domain that is tangent to the south pole 345 of the fundamental sphere 310. Step 514 is the second and final phase in the spherical parametrization of the trimming curves 220.

At step 516, the blending engine 150 iteratively fits a single parametric NURBS surface 240 based on the parametrized curves 360. Notably, the blending engine 150 ensures that the NURBS 240 surface satisfies continuity constraints associated with the pipe surfaces 210 and minimizes the thin-plate deformation energy. At step 518, the blending engine 150 trims the portions of the NURBS surface 240 that overlap the trimmed surfaces 230 to produce the blending surface 260. More precisely, the blending engine 150 projects the trimming curves 220 onto the NURBS surface 240 to produce the boundary curves 250. The blending engine 150 then trims the NURBS surface 240 based on the boundary curves 250 to produce the blending surface 260. At step 520, the blending engine 150 stitches the blending surface 260 to the trimmed surfaces 230 to generate the final surface 270, and the method 500 terminates.

In sum, the disclosed techniques may be used to blend arbitrary surfaces included in a model of a three-dimensional (3D) object. Such surfaces include cylinders, cones, and canal surfaces, to name a few. In operation, the blending tool receives a set of selected surfaces and generates trimming curves on the selected surfaces. The blending engine trims the selected surfaces based on the trimming curves to generate trimmed surfaces. The trimmed surfaces represent the portions of the selected surfaces that are not targeted for replacement with the smooth blending surface. The blending engine then best fits an algebraic sphere, referred to herein as a fundamental sphere, to the trimming curves. Subsequently, the blending engine performs a spherical parametrization that maps the trimming curves from 3D space to a two-dimensional parametric domain.

The spherical parametrization includes two phases. In a first phase, the blending engine projects the trimming curves onto the fundamental sphere to generate projected curves. In a second phase, the blending engine maps the projected curves onto a plane to generate parametrized curves in a two-dimensional parametric domain. The blending engine then constructs a single parametric NURBS surface that interpolates the parametrized curves while satisfying continuity constraints associated with the selected pipe surfaces and minimizing a thin-plate deformation energy. Subsequently, the blending engine removes portions of the NURBS surface that overlap the trimmed surfaces to produce a blending surface. Finally, the blending engine stitches the blending surface to the trimmed surfaces to generate a smooth, final surface that is included in the model.

Advantageously, the blending engine enables conventional CAD modeling subsystems to produce smooth blending surfaces with high curvature continuity between arbitrary surfaces. In particular, because the blending engine constructs a single parametric blending surface via a unified parametrization for all the trimming curves, the blending engine overcomes limitations of conventional blending techniques that are compatible with CAD modeling subsystems. Consequently, the blending engine automatically smooths models for complex physical objects to meet functionality, aesthetic, and/or manufacturing requirements that are not achievable using conventional blending techniques implemented in CAD modeling subsystems.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for blending a plurality of surfaces included in a three-dimensional (3D) model of an object, the method comprising:
    performing one or more trimming operations on at least two surfaces included in the plurality of surfaces based on a plurality of trimming curves to produce a plurality of trimmed surfaces;

generating a sphere based on the plurality of trimming curves and a sum of squared algebraic distances from the sphere to the plurality of trimming curves;

performing one or more spherical parametrization operations based on the plurality of trimming curves and the sphere to produce a plurality of parametrized curves;

generating a parametric blending surface based on the plurality of parametrized curves; and joining the parametric blending surface to the plurality of trimmed surfaces to generate a new model that includes at least one intersection between the at least two surfaces.

2. The method of claim 1, wherein performing one or more spherical parametrization operations comprises:
projecting the plurality of trimming curves onto the sphere to produce a plurality of projected curves; and
performing one or more stereographic projection operations that map the plurality of projected curves onto a plane in a 2D parametric domain.

3. The method of claim 1, wherein generating the sphere comprises best fitting the sphere to the plurality of trimming curves.

4. The method of claim 3, wherein best fitting the sphere comprises minimizing the sum of squared algebraic distances from the sphere to the plurality of trimming curves.

5. The method of claim 1, wherein generating the parametric blending surface comprises performing one or more interpolation operations based on the plurality of trimming curves and one or more continuity constraints associated with the plurality of surfaces.

6. The method of claim 5, wherein the one or more interpolation operations minimize a thin-plate deformation energy associated with the parametric blending surface.

7. The method of claim 1, wherein generating the parametric blending surface comprises:
generating a Non-Uniform Rational B-Spline (NURBS) surface based on the plurality of parametrized curves; and
performing one or more trimming operations on the NURBS surface based on the plurality of trimming curves.

8. The method of claim 1, wherein at least one of the at least two surfaces comprises a pipe surface.

9. One or more non-transitory computer-readable storage media including instructions that, when executed by one or more processing units, cause the one or more processing units to blend a plurality of surfaces included in a three-dimensional (3D) model of an object, by performing the steps of:
performing one or more trimming operations on at least two surfaces included in the plurality of surfaces based on a plurality of trimming curves to produce a plurality of trimmed surfaces;
generating a sphere based on the plurality of trimming curves and a sum of squared algebraic distances from the sphere to the plurality of trimming curves;
performing one or more spherical parametrization operations based on the plurality of trimming curves and the sphere to produce a plurality of parametrized curves;
generating a parametric blending surface based on the plurality of parametrized curves; and
joining the parametric blending surface to the plurality of trimmed surfaces to generate a new model that includes at least one intersection between the at least two surfaces.

10. The one or more computer-readable storage media of claim 9, wherein performing one or more spherical parametrization operations comprises:
projecting the plurality of trimming curves onto the sphere to produce a plurality of projected curves; and
performing one or more stereographic projection operations that map the plurality of projected curves onto a plane in a 2D parametric domain.

11. The one or more computer-readable storage media of claim 9, wherein generating the sphere comprises best fitting the sphere to the plurality of trimming curves.

12. The one or more computer-readable storage media of claim 11, wherein best fitting the sphere comprises minimizing the sum of squared algebraic distances from the sphere to the plurality of trimming curves.

13. The one or more computer-readable storage media of claim 9, wherein generating the parametric blending surface comprises performing one or more interpolation operations based on the plurality of trimming curves and one or more continuity constraints associated with the plurality of surfaces.

14. The one or more computer-readable storage media of claim 13, wherein the one or more continuity constraints include a $G^2$ continuity constraint that is associated with the at least two surfaces.

15. The one or more computer-readable storage media of claim 9, wherein the parametric blending surface comprises a Non-Uniform Rational B-Spline (NURBS) surface.

16. The one or more computer-readable storage media of claim 9, wherein at least one of the at least two surfaces comprises a cone or a cylinder.

17. A system comprising:
a memory storing a blending engine; and
a processor that is coupled to the memory and, when executing the blending engine, is configured to:
perform one or more trimming operations on at least two surfaces included in the plurality of surfaces based on a plurality of trimming curves to produce a plurality of trimmed surfaces;
generate a sphere based on the plurality of trimming curves and a sum of squared algebraic distances from the sphere to the plurality of trimming curves;
perform one or more spherical parametrization operations based on the plurality of trimming curves and the sphere to produce a plurality of parametrized curves;
generate a parametric blending surface based on the plurality of parametrized curves; and
join the parametric blending surface to the plurality of trimmed surfaces to generate a new model that includes at least one intersection between the at least two surfaces.

18. The system of claim 17, wherein the blending engine configures the processor to perform the one or more spherical parametrization operations by:
projecting the plurality of trimming curves onto the sphere to produce a plurality of projected curves; and
performing one or more stereographic projection operations that map the plurality of projected curves onto a plane in a 2D parametric domain.

19. The system of claim 17, wherein the blending engine configures the processor to generate the parametric blending surface by:
generating a Non-Uniform Rational B-Spline (NURBS) surface based on the plurality of parametrized curves; and performing one or more trimming operations on the NURBS surface based on the plurality of trimming curves.

20. The system of claim 17, wherein at least one of the at least two surfaces comprises a pipe surface.

21. A computer-implemented method for blending a plurality of surfaces included in a three-dimensional (3D) model of an object, the method comprising:

performing one or more trimming operations on at least two surfaces included in the plurality of surfaces based on a plurality of trimming curves to produce a set of trimmed surfaces;

performing one or more spherical parametrization operations based on the trimming curves and a sphere to produce a plurality of parametrized curves;

generating a parametric blending surface based on the parametrized curves, wherein generating the parametric blending surface comprises performing one or more interpolation operations based on the plurality of trimming curves and one or more continuity constraints associated with the plurality of surfaces, and the one or more interpolation operations minimize a thin-plate deformation energy associated with the parametric blending surface; and joining the parametric blending surface to the set of trimmed surfaces to generate a new model that includes at least one intersection between the at least two surfaces.

* * * * *